LUCIEN LaCOSTE
ARNOLD ROMBER
INVENTORS

March 18, 1952     L. LA COSTE ET AL     2,589,709
FORCE MEASURING DEVICE

Filed Sept. 12, 1946     4 Sheets-Sheet 2

LUCIEN LaCOSTE
ARNOLD ROMBERG
INVENTORS

BY Lester B. Clark
+ Ray L Smith
ATTORNEYS

Patented Mar. 18, 1952

2,589,709

UNITED STATES PATENT OFFICE 2,589,709

FORCE MEASURING DEVICE

Lucien La Coste and Arnold Romberg, Austin, Tex.

Application September 12, 1946, Serial No. 696,494

16 Claims. (Cl. 73—382)

This invention relates to improvements in measuring instruments which make it possible to obtain measurements when a steady base for the instrument is not accessible. It is of particular importance in making underwater gravity meter measurements and in making ordinary gravity meter measurements in marshy areas and near volcanoes.

When a delicate measuring instrument is placed upon an unsteady base the readings are affected, and particularly where the instrument has stops to prevent excessive movement of the balance member. Motions of the base cause the balance member to strike the stops and thereby introduce errors into the readings. The present invention contemplates an arrangement of the instrument whereby the frame which supports the balance member may be moved relative to the instrument as a whole when the balance member approaches the stops and then the frame can be returned to its initial position when the balance member moves away from the stop. In this manner there is not an excessive movement as between the balance member and the supporting frame, but the supporting frame is moved so as not to interfere with the swing or movement of the balance member.

A primary object of this invention is to obtain an underwater remote controlled gravity meter with which gravity measurements can be made in rough weather and on soft bottoms.

A second object is to obtain a gravity meter with which gravity measurements can be made when it is resting on a support which undergoes earthquake motions or motions similar thereto such as supports undergo in marshy land.

A further object of the invention is to prevent the moving beam in the gravity meter from striking its limiting stops when the gravity meter support is accelerated.

A still further object is to counterbalance large accelerations of the gravity meter support by introducing additional counterbalancing accelerations.

An additional object is to prevent such additional counterbalancing accelerations from introducing errors into the gravity measurements.

A further object is to damp out large initial kinetic energies that the gravity meter beam might have when it is first released or which it might acquire when the meter is badly jarred.

The foregoing objects are primary objects and together with other objects will become more apparent by reference to the following description and accompanying drawings in which.

Figure 1:
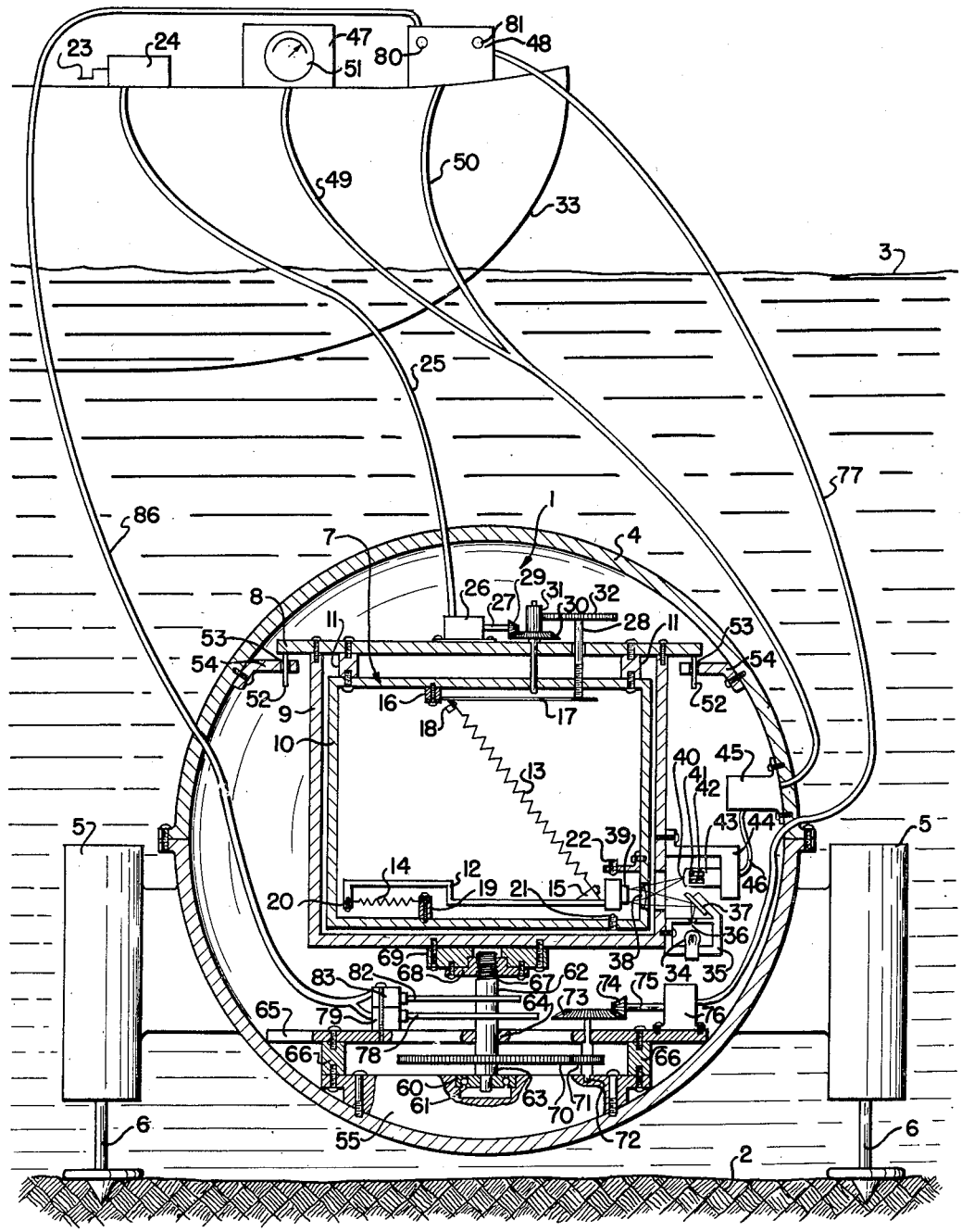
Fig. 1 is a side elevation partly in section showing the preferred form of the invention.

In order to explore underwater and marshy areas, attempts have been made to use gravity meters in underwater geophysical exploration by submerging them and allowing the meter to rest on bottom. In these attempts, however, satisfactory results have been obtained only on very calm days and only on bottoms which were not very soft.

The importance of making a gravity meter for underwater use that can be employed on soft bottoms can hardly be overemphasized because a complete gravity map cannot be obtained otherwise in many regions. Furthermore, in view of the high cost of underwater gravity surveys it is extremely desirable that underwater gravity meters be capable of operation in weather that is not calm.

The failure of present underwater gravity meters to operate in rough weather or on soft bottoms is due to two difficulties: (1) water currents disturb the gravity meter, and (2) the bottom itself moves. The first of these difficulties namely, water currents, can be sufficiently reduced by using a shield as described in our copending application, Serial Number 678,204, filed June 21, 1946, on a Leveling Device, or by jetting the gravity meter under the bottom of the body of water, or by various other means.

The second difficulty, namely, the motion of the bottom, can be resolved into rotations, horizontal translations, and vertical translations. The rotations are small and do not cause substantial trouble.

The horizontal translations are sometimes large enough to cause the moving system of an ordinary gravity meter to strike the stops provided in the gravity meter housing for limiting the motion of the moving system. This motion must be kept small to avoid errors due to hysteresis in the gravity meter spring. However, considerable damping for relative horizontal motion between the gravity meter housing and moving system can be provided without interfering with the operation of the gravity meter. This will prevent horizontal translations from causing the movable system to engage the stops.

Vertical translations, however, are also large enough to cause the movable system to strike the stops, but in this case the vertical damping in the gravity meter cannot be increased sufficiently to prevent hitting the stops without seriously affecting the operation of the gravity meter. Any increased vertical spacing of the stops increases errors due to hysteresis in the spring supporting the moving system. Increased vertical damping increases the reading time to such an extent as to be prohibitive.

If the moving system of a gravity meter can be prevented from hitting the stops, a reading can be obtained by averaging the position of the movable system or gravity meter beam. A satisfactory electrical averager can be made for a good gravity meter. A diagram of such an averager is included in this disclosure. The real problem therefore, is to obtain a device which will prevent the gravity meter beam from hitting the vertical motion stops when the meter is subjected to vertical accelerations.

The present invention is a device for temporarily displacing the frame which supports the movable system so that during movement of the system it will not strike the frame. The displacing of the frame merely moves it out of the path of the moving system temporarily until the moving system starts back on its reverse swing and the frame is then returned to its initial position. Such displacement of the frame avoids interference with the moving system so it does not affect the average beam position. Such movement of the frame prevents vertical translations of the ground from causing the beam to strike the stops by applying counterbalancing translations when the beam is near the stops. Obviously the counterbalancing translations or displacement of the frame will introduce an error into the measurement of gravity unless their average acceleration during the time of taking a reading is negligible. This condition is met by introducing suitable additional translations while the gravity meter beam is not near either the top or bottom stops on the frame. The method of doing this will be made clear by a study of the device itself.

In Fig. 1 the submersible portion 1 of a remote control gravity meter is shown resting on the bottom 2 below a body of water 3. The submersible portion 1 is shown as including a frame structure shown as a water-tight container 4 fixed to leveling jacks 5 whose extensible members 6 rest on the bottom 2 of the body of water. The detailed construction of such jacks is to be found in our copending application Serial Number 678,204, filed June 21, 1946, for Leveling Device. The container 4 is leveled by varying the position of the extension members 6.

In the container 4 is mounted a gravity meter 7; of the general type shown in our Patents Numbers 2,293,437 and 2,377,889. A brief description of the gravity meter will first be given as an aid in describing the invention. Gravity meter details to be described are not necessarily those of the best gravity meter design, but instead are given for simplicity since details of this nature are not a part of this invention. Gravity meter details are given in our above patents.

The gravity meter 7 includes a top plate 8, and outer housing 9 which are screwed together. The inner housing 10 is fixed to the top plate 8 through the heat insulating blocks 11. The gravity responsive beam 12 is suspended by the main spring 13 and the pair (one behind the other) of springs 14. The spring 13 is clamped to the beam 12 by the clamp 15 on the beam. The spring 13 is supported from the inner housing 10 through the block 16, the leaf spring 17 which is clamped to block 16 and the clamp 18 on the leaf spring. The pair of springs 14 are clamped to the blocks 19 on the inner housing 10 and are clamped to the beam 12 by the clamps 20. It is therefore clear that the beam 12 will rotate about a horizontal axis under the influence of changes in gravity.

Rotation of the beam 12 is limited by the lower stop 21 and the upper stop 22 both of which are fixed with respect to the inner housing 10 in such a manner that the beam is limited in its movement to such an extent that the spring 13 will not be subjected to appreciable hysteresis. The force of gravity on the beam is balanced by vertical adjustment of the clamp 18 to which the main spring 13 is clamped. This vertical adjustment is produced by turning the crank 23 of the self synchronous generator 24 which is electrically connected through cable 25 to the self synchronous motor 26.

The motor 26 turns as many revolutions as the generator 24. The shaft 27 of the motor 26 transmits rotation to the screw 28 through the gears 29, 30, 31, and 32. The screw 28 is threaded in the inner housing 10. The lower end of the screw 28 presses against the leaf spring 17. As the screw 28 moves downwardly the clamp 18 on the leaf spring moves downwardly by a smaller amount. The tension on the main spring 13 and therefore the equilibrium position of the beam 12 can therefore be adjusted by suitable rotation of the crank 23 of the self synchronous generator 24 on the boat 33.

A photoelectric cell system is used to give remote indications of the position of the beam 12. The system includes an electric lamp 34 clamped in the bracket 35 which is fixed to the outer housing 9. No source of potential for the lamp is shown. The lamp illuminates the slit 36 in the bracket 35. Light from the illuminated slit strikes the mirror 37 which is also fixed to the bracket 35; the light is reflected to pass through the converging lens 38 mounted on the inner housing 10. The light then is reflected from the mirror 39 fixed to the beam 12 and passes through the lens 38 again. The lens causes the light to converge and form an image 40 of the slit 36.

The image 40 falls on one or both cathodes 41 and 42 of the double photoelectric cell 43 which is clamped in the bracket 44 fixed to the outer housing 9. The position of the beam 12 determines where the image falls with respect to the two cathodes 41 and 42. Generally the zero or reference position of the beam is taken as the position which causes equal amounts of light from the image to fall on the two photoelectric cell cathodes. The photoelectric cell 43 is electrically connected to the amplifier 45 through the cable 46. The amplifier gives a voltage output proportional to the difference in the two cathodes. Furthermore, the voltage output has one sign when the beam 12 is near the top stop 22 and the other sign when the beam is near the bottom stop 21. Amplifiers capable of satisfying these conditions are well known in the art.

Figure 6:
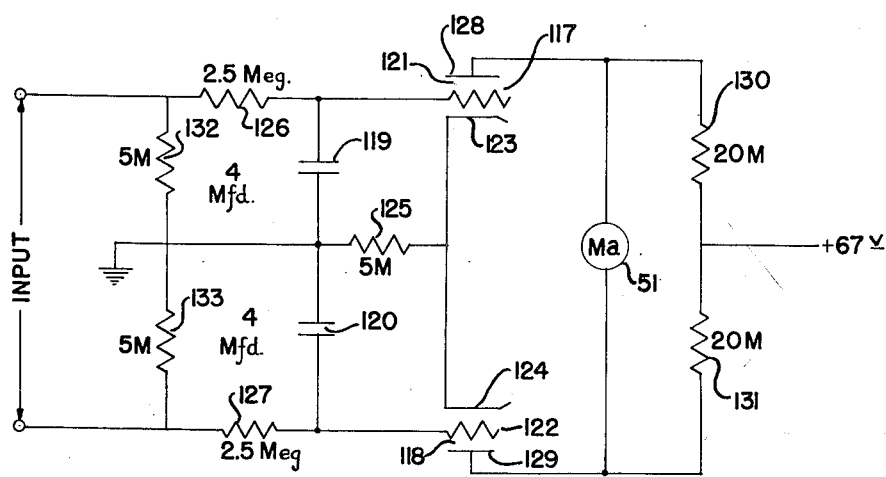
Fig. 6 is a wiring diagram of the averaging device used to obtain the average position of the gravity meter beam.

The output of the amplifier is delivered to the averager 47 and to the relay unit 48 through the cables 49 and 50 respectively which extend to the boat 33. The averager is an amplifier with a time delay. Fig. 6 gives a circuit for an averager; it will be described later. The time delay causes the meter 51 to give an average indication of the position of the beam 12. In actual practice a time delay of 10 seconds gave good results. The properties and construction of the relay unit will be considered later.

The parts of the underwater gravity meter which have been described up to this point are sufficient to enable measurements of gravity to be made when there are not appreciable disturbances on the bottom of the body of water, that is, when the disturbances are not large enough to cause the beam 12 to strike the stops 21 and 22 very often. Readings are taken by merely rotating the crank 23 until the meter 51 on the averager indicates its zero reading and noting the total angular displacement in revolutions and fractions thereof of the crank from a predetermined reference position. The difference in gravity at two stations is proportional to the difference in angular displacements of the crank required to obtain readings at the two stations.

The present invention relates particularly to the portions of the underwater gravity meter which eliminate the bumping of the beam on the stops and will now be described. The top plate 8 of the frame of the gravity meter 7 has two vertical rods 52 fixed to it. These rods can slide freely in holes 53 in brackets 54 which are fixed to the watertight container 4. The outer housing or frame 9 is thereby capable of being translated or displaced vertically relative to the container 4, but not horizontally.

Predetermined amounts of vertical translation are made possible by means of the following construction. The Bakelite (or other heat insulating material) piece 55 is fixed to the container 4. The ball bearing 60 fits into the hole 61 in the piece 55. The shaft 62 fits in the ball bearing 60 and has a shoulder 63 which fits against the top of the inner race of the ball bearing. The ball bearing thus takes downward thrust exerted by the shaft 62.

A second bearing 64 for shaft 62 is provided by the plate 65 which is fixed to the piece 55 through the Bakelite blocks 66. A threaded portion 67 is provided on the upper end of shaft 62. This threaded portion engages a nut 68 which is fixed to the outer housing 9 through the Bakelite spacer 69. A gear 70 is fixed to shaft 62. This gear engages gear 71 which is fixed to countershaft 72. The bevel gear 73 is also fixed to countershaft 72 and engages the bevel gear 74 which is fixed to the shaft 75 of the reversible electric motor 76. The electric motor is fixed to plate 65 and is controlled from the relay unit 48 through the cable 77. From the preceding description it can be seen that when the motor shaft 75 rotates, the outer housing 9 is translated vertically.

Figure 2:
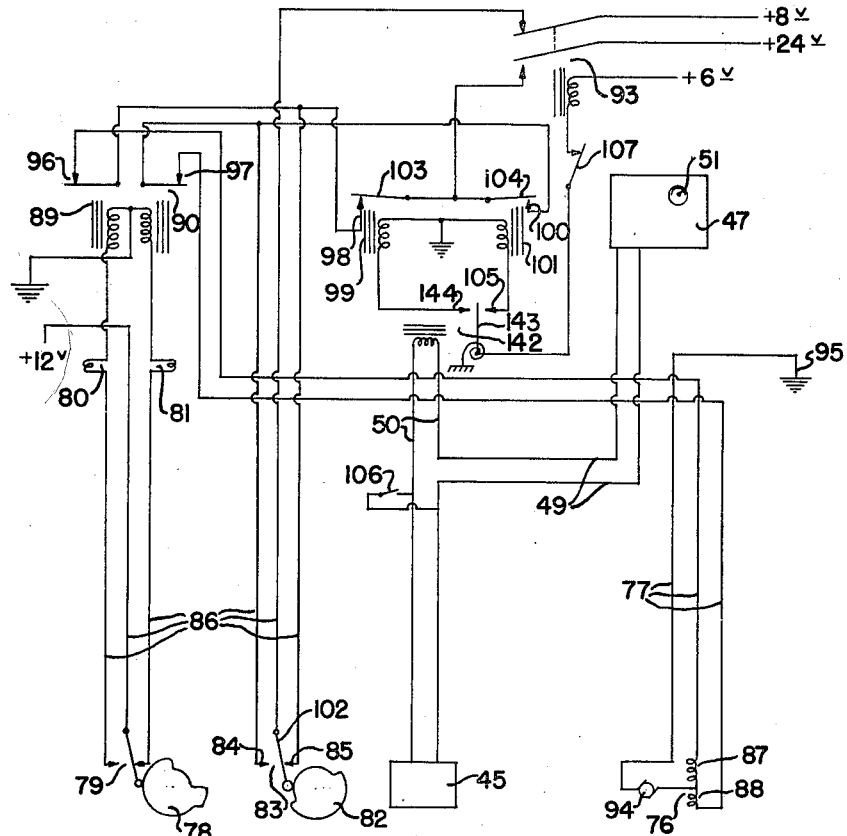
Fig. 2 is a wiring diagram for the preferred form of the invention.

The cams 78 and 82 are fixed to shaft 62 and operate respectively the limit switch 79 and the switch 83. The cams and switches are better shown in Fig. 2. The relay unit 48 receives its inputs from the beam position amplifier 45 and from the switches 79 and 83; its output goes to the motor 76 which controls the vertical translation of housing 9. Fig. 2 shows a circuit diagram of the relay unit and its connections with other units of Fig. 1.

In Fig. 2 the motor 76 is shown as having two series fields 87 and 88. If current is sent through field 87, the motor will rotate in such a direction as to lower housing 9, and if current is sent through field 88, the motor will rotate in such a direction as to raise housing 9. The motor armature 94 is grounded at 95, and the motor field 87 is connected to the contact 96 of relay 89. This relay must therefore be closed in order for the motor to be able to move housing 9 downwardly.

Relay 89 is controlled by cam 78 and therefore serves as a lower limit relay for motion of housing 9. Similarly relay 90 is an upper limit relay for motion of housing 9. Lamps 80 and 81 are indicating lamps for indicating respectively when the lower and upper limits have been reached.

When the limit relays 89 and 90 are closed (neither limit being reached) the motor field 87 is connected to contact 85 of switch 83 and to contact 98 of relay 99. Also the motor field 88 is connected to contact 84 of switch 83 and to contact 100 of relay 101. It is therefore apparent that switch 83 can control the rotation of motor 76 if the contact arm 102 of switch 83 is at a positive potential and that relays 99 and 101 can control the rotation if the contact arms 103 and 104 are at a positive potential.

Whether switch 83 or relays 99 and 101 control the motor is determined by the sensitive relay 142. This relay is operated by the output of the beam position amplifier 45. The relay is adjusted so that when the beam 12 is near its lower stop 21, the relay arm 143 touches the contact 144. It is also adjusted so that when the beam 12 is near its upper stop 22, the relay arm 143 touches the contact 105. The relay is also of such a type that when the beam 12 is not near either stop, the arm 143 does not touch either contact; a relay of this type is the Weston Relay Model No. 534.

It is now apparent that when the beam 12 is not near either stop the double pole relay 93 is not energized and a positive potential is applied to switch 83, but not to relays 99 and 101. Under this condition switch 83 controls the motor 76. Switch 83, however, is controlled by cam 82 which moves in accordance with the vertical translation of the housing 9. When housing 9 is near a predetermined reference position or zero position, the arm 102 of switch 83 does not touch either contact and the motor 76 stands still. When housing 9 is appreciably below its zero position the switch arm 102 touches contact 84 which causes motor 76 to raise the housing. Similarly if the housing is appreciably above its zero position, the arm 102 will touch contact 85 and the housing will be lowered. It is therefore apparent that if the beam 12 is not near either stop and the housing 9 is appreciably away from its zero position, then the motor 76 will operate to return the housing to its zero position.

Let us now consider what happens when the beam 12 moves close to the lower stop 21. When this happens arm 143 of relay 142 touches contact 144 which energizes both relay 93 and relay 99. The energizing of relay 93 removes the 8 volt positive potential from switch 83 and impresses a 24 volt positive potential on the contact arms 103 and 104 of relays 99 and 101. The energizing of relay 99 causes the relay arm 103 to touch the contact 98 which causes the motor 76 to lower the housing 9. Since stop 21 is fixed to housing 9, this lowering moves the stop away from the beam and prevents the beam from hitting it. In a similar way when the beam moves near the upper stop 22, relays 93 and 101 are energized which causes the motor 76 to raise the housing 9 and prevent the beam from hitting the upper stop.

The operation of the relay unit may now be summed up as follows. When the beam approaches a stop, the stop is caused to move away from the beam by translating the housing. When the beam is not near a stop, the housing is caused to move back to its zero position. If the housing should move to its lower or upper limiting positions, the motor will be prevented from moving it any farther from its zero position and a lamp will indicate which limiting position has been reached.

The method of operation of the invention when a measurement of gravity is made will now be considered. To be specific let us assume that the gravitational torque on the beam 12 is considerably greater than the torque exerted by the spring 13. Under this condition the beam will spend more time near the lower stop 21 than near the upper stop 22. This will be indicated by a low indication on the meter 51 of the averager 47, and it will also result in the housing 9 being accelerated downwardly more than upwardly in order to prevent the beam from hitting the lower stop.

The low indication of the averager will cause the operator to rotate the crank 23 to increase the tension in the spring 13. If, however, the operator does not increase the spring torque sufficiently to approximately equal the gravitational torque in a few minutes, the housing 9 will reach its lower limit. The operator will find this out by noting that the lamp 80 is lit. He will then open switch 107 which will allow switch 83 in the relay box to take control of the motor and bring the housing back to its zero position.

This procedure is repeated until the indication of the averager is brought near its zero value. The housing will then not reach its limits any more unless it just happens to be near a limit when the adjustment of spring tension is made approximately correct. With the housing no longer reaching its limits the adjustment of the averager reading to zero can be made very simply.

It has been mentioned that only 8 volts is applied to the motor 76 when it is controlled by switch 83 while 24 volts is applied to it when it is controlled by relays 99 and 101. The purpose of this is to make the motor respond rapidly when the beam is approaching a stop, but to reduce the hunting to a minimum. An equal voltage or motor speed under both conditions is entirely satisfactory however.

The invention has been described in connection with a null reading gravity meter rather than with a deflection type of instrument. Obviously it could be used with a deflection type of instrument. In this case the reading would be obtained from the averager rather than from the angular displacement of the crank 23 required to make the averager read zero. It is often more difficult, however, to get a good average with a deflection type of instrument because they are not generally as linear as the null instruments are.

Another form of the automatic embodiment of the invention is the following. It differs from the general preferred form just described. This form is incorporated in Fig. 2 in that the relay 142 is adjusted so that contact 144 is closed when the beam 12 is appreciably below its zero position, and so that contact 105 is closed when the beam is appreciably above its zero position. This adjustment will cause the motor 76 to operate to keep the beam very near its zero position; it will also prevent the returning switch 83 from controlling the motor except when switch 107 is opened.

The operation of this system is as follows. Assume that the gravitational torque is greater than the spring torque. The motor 76 will then have to accelerate the housing 9 downwardly in order to keep the beam 12 at its zero position. This will soon cause the housing to reach its lower limit, which will be indicated by the lighting of the lamp 80. The operator will then turn the crank 23 of the self synchronous generator 24 to increase the spring torque and will open the switch 107 to allow the housing 9 to return to its zero position. This procedure is then repeated until the housing reaches its upper limit. Successive approximations are then continued to bracket the correct adjustment more closely.

In this method although the correct adjustment is made, the housing 9 may still reach either its upper or lower limits. This can be seen as follows. Assume that the gravity meter is not subjected to any earthquake motions and that the spring torque is perfectly adjusted for equilibrium, with the gravitational torque. It will be further assumed that the switch 107 is closed at the instant when the beam 12 is at its zero position, but moving toward the lower stop with a considerable velocity. The relay 142 will then operate to cause the housing 9 to move downwardly with the same velocity. The beam will then remain perfectly balanced at its zero as long as housing 9 continues to move with the same velocity. But this will cause the housing to reach its lower limit. Similarly if the beam had been moving toward the upper stop instead of toward the lower stop at the instant switch 107 was closed, the housing would have reached its upper limit.

It should be pointed out that the preferred form of the invention does not have this difficulty. Its operation under the previous conditions with the downward initial velocity are as follows. When the switch 107 is closed, the downward initial velocity of the beam 12 will carry it near the lower stop. In this process some of the initial downward velocity will be lost because of damping between the beam and housing 9; such damping is present in all gravity meters.

The relay contact 144 will then be closed and the housing 9 will be translated downwardly to prevent stop 21 from being hit. The beam will remain for some time near the lower stop. In this condition the torque exerted by the spring 13 will exceed the gravitational torque exerted on the beam. This will cause the weighted end of the beam to be accelerated upwardly. The upward acceleration will soon give the weighted end of the beam an upward velocity. This upward velocity will carry the beam to a position near its upper stop and the damping resistance encountered in this motion will further reduce the velocity of the beam. If the beam still has enough momentum to carry it to the upper stop 22, the housing 9 will be translated upwardly to prevent the beam from hitting the stop. This type of oscillating movement will continue until the damping present in the gravity meter reduces its amplitude to an amount insufficient to move the beam near the stops. The motor 76 will then no longer operate (if there is no earthquake motion) and the damping will decrease the oscillations to zero.

Figure 3:
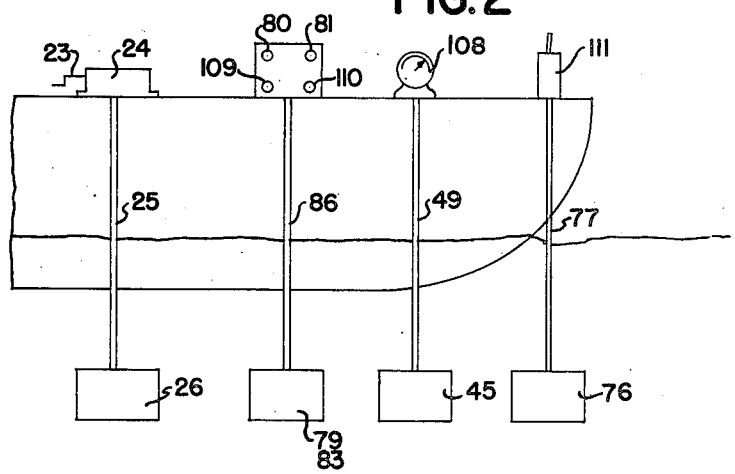
Fig. 3 shows a form of the invention for manual operation.
Figure 4:
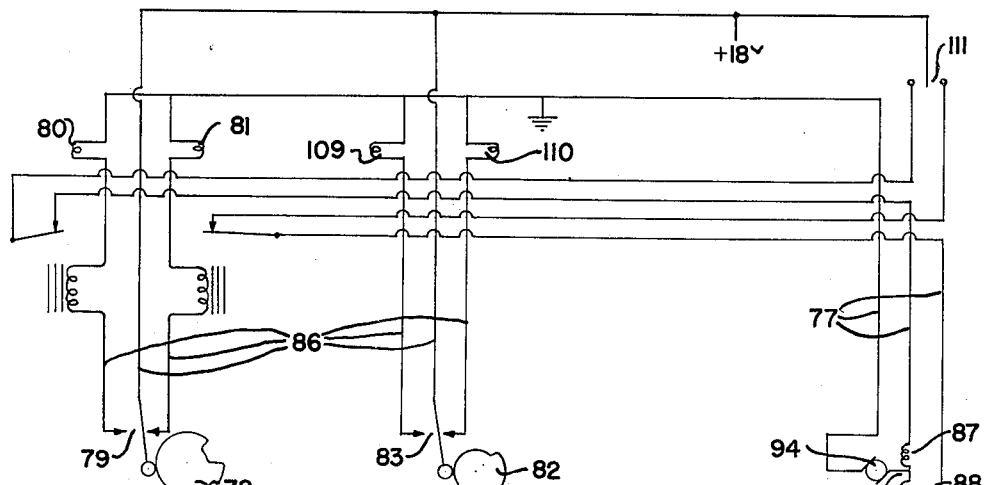
Fig. 4 is a wiring diagram for the form of the invention of Fig. 3.

A very simple modification of the invention is indicated in Figs. 3 and 4. This Fig. 3 shows only the portions of this form of the invention which lie above the water surface because the portions which lie below the surface are exactly as shown in Fig. 1.

The tension on the gravity meter spring 13 is controlled by rotation of crank 23 exactly as in the preferred form of the invention. However, in the simplified form of the invention no averager is shown; instead the output of the beam position amplifier merely operates the electric meter 108. It is intended that the operator do his own averaging. The limit cam switch 79 operates the lamps 80 and 81 as before to indicate when the housing 9 is at its lower or upper limit respectively. This is shown in the wiring diagram of the simplified form of the invention shown in Fig. 4.

Fig. 4 also shows that the switch 83 now merely operates the lamps 109 and 110 to indicate respectively when the housing is below or above its zero position. The motor 76 is now controlled manually by the three position switch 111.

The operation of the simplified form of the invention is as follows. When the beam 12 approaches a stop, meter 108 indicates it and the observer controls motor 76 by operating switch 111 to prevent the beam from hitting the stop. When the beam is not near either stop, the observer looks at the lights 109 and 110 to determine which way to operate the motor to bring the housing back to its zero position. If the average reading of meter 108 is low or the housing 9 reaches its lower limit as shown by lamp 80, the observer rotates the crank 23 to increase the spring tension in the gravity meter and vice versa.

The preceding operation is difficult for an operator but can be done under favorable conditions. The preferred form of the invention is very much superior to it however, as it operates perfectly under conditions in which the simplified form is entirely useless.

Figure 5:
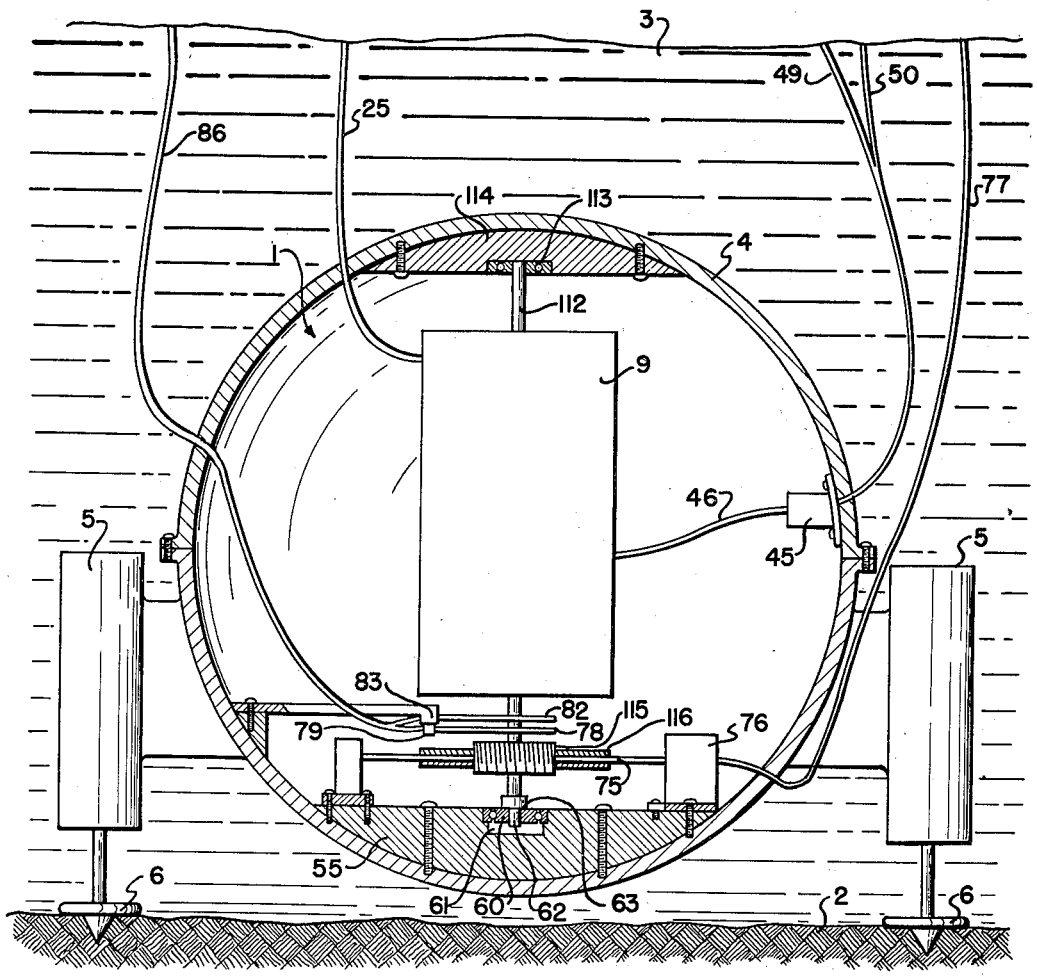
Fig. 5 is a side elevational view partly in section showing the invention applied to a torsion type gravity meter.

Fig. 5 shows a method of applying the invention to a torsion type of gravity meter in which rotation of the beam takes place about a vertical axis. Fig. 5 is rather similar to Fig. 1 and corresponding parts are numbered the same. In Fig. 5 however, the outer gravity meter housing 9 is mounted in the water tight container 4 in such a way as to permit rotation about a vertical axis rather than to permit vertical translation. This mounting is done as follows. The shaft 112 is fixed to the housing 9 and rotates in the ball bearing 113 whose outer race is pressed into the block 114 which is fixed to the water tight container 4.

Similarly the shaft 62 is fixed to housing 9 and rotates in the ball bearing 60 which fits in the hole 61 in the Bakelite block 55. The Bakelite block is fixed to the container 4. The shoulder 63 on shaft 62 rests on the inner race of ball bearing 60 and supports the weight of housing 9.

Housing 9 is rotated by the reversible electric motor 76 through the worm 115 fixed to the motor shaft 75 and through the worm gear 116 fixed to shaft 62.

The operation of this form of the invention is the same as that of the preferred form of the invention except that rotations about a vertical axis are used in place of vertical translations to prevent the beam from hitting its stops.

Fig. 6 shows a wiring diagram of a satisfactory averager. The averager is merely an amplifier with a time delay in its input. The input is applied across the two equal resistors 132 and 133 in series in order to obtain two equal input voltages for the two vacuum tubes 117 and 118. The large capacity condensers 119 and 120 are connected respectively between the grid 121 and the cathode 123 through the cathode resistor 125 and between the grid 122 and the cathode 124 through the cathode resistor 125. The signals are applied between the said grids and cathodes respectively through the high resistors 126 and 127 and thereby a time delay or averaging is obtained because the condensers have to be charged through the resistors. The positive terminal of the B battery is connected to the plates 128 and 129 respectively through the plate resistors 130 and 131. The microammeter 51 connected between the plates measures the input voltage.

Broadly this invention comprehends the application of controlled accelerations to the housings of measuring instruments in order to counteract or counter-balance disturbances in the effects being measured.

The invention claimed is:

1. A gravity meter including a support, a weight, a spring suspending said weight from said support, means for accelerating said support to avoid interference with the movement of said weight, and means for averaging the displacement of the weight relative to the support.

2. A gravity meter including a support, a weight, a spring suspending said weight from said support, and means for accelerating said support as a function both of the movement of the support and of the movement of said weight relative to the support.

3. An instrument for making measurements where a steady base therefor is not accessible, including a support, a moving system supported by said support, means for temporarily displacing said support, means for indicating such displacement of said support so as to compensate therefore in determining the instrument readings, and additional means for averaging the displacement of the movable element relative to the support.

4. A gravity meter including a support, a weight, a spring suspending the weight from the support, means operable when the weight exceeds a predetermined displacement from a predetermined zero position with respect to the support to in turn displace the support to limit said displacement relative to said support, the said means also being operable when the predetermined displacement is not exceeded to return the support to a second predetermined zero position, means for averaging the displacement of the weight from the first zero position, and means indicating when the support has exceeded a second predetermined displacement from the second zero position.

5. A gravity meter including a support, a weight, a spring suspending the weight from the support, a case, means operable when the weight exceeds a predetermined displacement from a predetermined zero position with respect to the support to accelerate the support with respect to the case to limit the displacement of the weight relative to the support, the said means also being operable when said predetermined displacement is not exceeded to return the support to a second predetermined zero position with respect to the case, means for averaging the displacement of the weight from the first zero position, and means indicating when the support has exceeded a second predetermined distance from the second zero position.

6. A gravity meter including a support, a weight, a spring suspending the weight from the support, means operable when the weight exceeds a predetermined displacement from a predetermined zero position with respect to the support to give the support a vertical acceleration to limit said displacement of the weight relative to the support, the said means also being operable when the predetermined displacement is not exceeded to return the support to a second predetermined zero position, means for averaging the displacement of the weight from the first zero position, and means indicating when the support has exceeded a second predetermined displacement from the second zero position.

7. A gravity meter including, a support, a weight, a spring suspending the weight from the support, said weight being adapted to rotate about a vertical axis under the influence of variations in gravity, means operable when the weight exceeds a predetermined angular displacement from a predetermined zero position with respect to the support to give the support an angular acceleration about a vertical axis to limit said angular displacement relative to said weight, the said means also being operable when the predetermined angular displacement is not exceeded to return the support to a second zero position, means for averaging the angular displacement of the weight from the first zero position, and means indicating when the support has exceeded a second predetermined angular displacement from the second zero position.

8. A force measuring instrument comprising, a support, a force responsive element, means supporting said element to move in response to variations in the force being measured, and means for displacing said support to avoid interference with the movement of the element, and means for averaging the displacement of the force responsive element relative to the support.

9. A force measuring instrument including, a support, a movable element adapted to move in response to a force being measured, means for displacing said support in a direction to avoid interference with the movement of said element, and means for averaging the displacement of the movable element relative to the support.

10. The method of making measurements with a force measuring instrument having a support and a moving system thereon responsive to the force to be measured comprising the steps of, moving the support of the instrument in a direction to avoid interengagement of the system with the support due to relative movement therebetween, and returning the support to a predetermined reference position when danger of interengagement of the support and system has passed.

11. The method of making measurements with a force measuring instrument having a support and a moving system thereon responsive to the force to be measured comprising the steps of, moving the support of the instrument in a direction to avoid interengagement of the system with the support due to relative movement therebetween, returning the support to a predetermined reference position when danger of interengagement of the support and system have passed, and simultaneously averaging the relative position of the moving system and support.

12. The method of making measurements with a force measuring instrument having a support and a moving system thereon responsive to the force to be measured comprising the steps of, moving the support of the instrument in a direction to avoid interference with movement of the system, measuring the displacement of the moving system from a predetermined zero position, and simultaneously averaging the relative position of the moving system and the support.

13. A gravity meter comprising a frame structure, a support adjustably carried by the frame structure, power means for adjusting said support on said frame structure, a gravity responsive means including means yieldably suspending a weight from said support, means for sensing movement of said gravity means in excess of a predetermined limit relative to the support, and means connecting said sensing means to said power means to cause said power adjusting means to displace said support in a direction to limit the movement of said gravity means relative to said support.

14. A gravity meter comprising a frame structure, a support adjustably carried by the frame structure, power means for adjusting said support on said frame structure, a gravity responsive means including a spring suspending a weight from the support, means for sensing movement of said gravity means in excess of a predetermined limit relative to the support, and means connecting said sensing means to said power means to cause said power adjusting means to displace said support in a direction to limit the movement of said gravity means relative to said support.

15. Apparatus of the kind recited in claim 14 wherein the frame structure comprises a watertight casing.

16. A force measuring instrument including, a movable element adapted to move in response to a force being measured, a support therefor, means, responsive to excess relative movement between the force responsive element and the support, for displacing said support in a direction to avoid interference with the movement of said element, and means for averaging the displacement of the movable element relative to the support.

LUCIEN LA COSTE.
ARNOLD ROMBERG.

REFERENCES CITED

The following references are of record in the file of this patent:

UNITED STATES PATENTS

| Number | Name | Date |
|---|---|---|
| 1,350,705 | Clarke | Aug. 24, 1920 |
| 1,921,983 | Wittkuhns | Aug. 8, 1933 |
| 1,930,945 | Sjostrand | Oct. 17, 1933 |
| 2,253,472 | Pepper | Aug. 19, 1941 |
| 2,362,135 | James | Nov. 7, 1944 |
| 2,367,126 | James | Jan. 9, 1945 |

OTHER REFERENCES

Ser. No. 297,006, Steinen (A. P. C.), published May 25, 1943.